United States Patent [19]

Massey

[11] 3,917,547

[45] Nov. 4, 1975

[54] ORGANIC-INORGANIC FOAMED FOAM
[75] Inventor: David H. Massey, Glencoe, Ill.
[73] Assignee: Phoenix Corporation, St. Paul, Minn.
[22] Filed: Jan. 14, 1974
[21] Appl. No.: 433,146

[52] U.S. Cl............ 260/2.5 AK; 428/308; 428/406
[51] Int. Cl.$^2$... C08G 18/14; C08J 9/32; C08K 7/28
[58] Field of Search .............................. 260/2.5 AK

[56] References Cited
OTHER PUBLICATIONS
AD-763 378, "Development and Evaluation of Deep-Sea Swimsuit Materials," Nav. Clothing & Tex. Res. Unit, June 1973.

*Primary Examiner*—Donald E. Czaja
*Assistant Examiner*—C. Warren Ivy

[57] ABSTRACT

The invention relates to compositions of matter in which certain inorganic particles contained in flyash are added to foamed flexible polymeric compositions to improve and extend their physical characteristics. More specifically, cenospheres (irregular-shaped, glass-like, hollow particles derived from flyash), are added to various foams, especially flexible polyurethane.

2 Claims, No Drawings

ORGANIC-INORGANIC FOAMED FOAM

Polymeric foam materials have enjoyed great success in a variety of applications. Polyurethane foams, both rigid and flexible, are used in large quantities. Polystyrene and polyvinyl chloride foams are also used extensively. Other polymers, such as polyesters, epoxy resins, phenolics, polyethylene, polypropylene, ABS, ABA, and so forth are used in specialty foam applications.

It has now been discovered that flyash containing cenospheres can be added to these foams and thereby materially increase and extend the useful properties of the foam. As a diluent and extender of the pre-foamed polymer or polymer ingredients, the flyash blends rapidly and uniformly. This ability to blend rapidly, uniformly, and stay blended is an added feature of the composition as compared to ordinary fillers, such as sand, barytes, "Cabosil," calcium carbonate or other commonly used fillers. Likewise, the compositions of this invention do not "cake" or agglomerate and are, therefore, easy to redisperse in case of concentration over a long period of inclusion within a dispersing medium without being agitated.

As will become more apparent in the complete specifications, flyash contains hollow particles which could be called an inorganic foam. The particles vary in size and contain in many instances more than one void space and/or are a composite of several single hollow particles. Thus, the addition of these particles into the matrix of an organic polymeric foam, produces an "organic-inorganic foamed foam" or foam within a foam.

After foaming, even more remarkable results are obtained in regard to the physical properties of the "foamed foam," especially in the areas of the tear strength and the compressive strength of the foam. Furthermore, the addition of flyash retards the ability of the polymeric foam to produce smoke upon burning, and increases the sound dampening effects. Likewise, if comparable results are achieved with less organic foam materials, there is less material to burn.

Mineral fillers in the form of particles generally drastically weaken the tear strength. However, the compositions of this invention have substantially the same or improved tear strength characteristics. Also, a high percentage by volume of filler to resin can be achieved without unduly raising of viscosity. For example, compositions containing 50 percent or more by volume of filler are useful.

In processing pre-foamed compositions of this invention for molding, such as in pumping or milling, the materials are able to withstand the compressive shear and other stresses involved.

Additional advantages of the liquid-dispersed combination prior to preparation of the foam are the easy mixing of the portion of filled composition with other ingredients, a minimal effect on the reaction processes, and no absorption of the organic materials.

Intended applications of the improved foams of this invention are in appliances, automobiles (interior and exterior), building products, adhesives, marine products, cushions, seats, furniture, flooring, packaging materials, wearing apparel and recreational ground surfacing compositions. The principal intended uses are with flexible foams. Those applications requiring good tear resistance and minimal compression but requiring flexibility and resiliency or elasticity and/or good impact absorption with recovery of shape are best able to take advantage of the improved properties imparted in polymeric foams in accordance with the teachings of this invention. Furthermore, these properties are imparted such that they are present over a wide temperature range.

Generally speaking, the foams of this invention can be cut easily with a knife or saw, especially as compared to other inorganic fillers such as sand.

Flyash is an inorganic by-product produced in the burning of coal at high temperatures. As such, its composition will vary depending upon the sources of the coal and its mineral content. Flyash is composed primarily of $SiO_2$, $Al_2O_3$, and $Fe_2O_3$ and is light and fluffy for an inorganic material. Most flyash is that collected where coal is burned in large quantities at electricity generating plants. (Flyash is to be distinguished from the slag particles which are heavier and larger and which are collected from the combustion chamber itself.) One component of flyash that is extremely important for the purposes of this invention and the advantages imparted to the foams are the irregular-shaped, glass-like hollow particles, i.e., cenospheres, contained in the flyash, usually in the range of 5 to 30 percent by volume.

The preferred flyashs of this invention are those which contain a significant portion of "cenospheres" as described by Dr. J. W. Pedlow in Paper No. A-4 at the Third International Ash Utilization Symposium in Pittsburgh, Pennsylvania on March 13-14, 1973. These cenospheres, which average 10-200 microns in diameter, are coherent, non-porous shells of silica glass having a shell that may be characterized by rough areas on the outer surfaces and are about one tenth of the radius. The true particle density of the cenospheres is in the range of 15-50 pounds per cubic foot and the random bulk density is in the range of 10-40 pounds per cubic foot. As stated by Dr. Pedlow, the cenospheres are produced in the highest concentrations with the burning of high fusion coal where the $Fe_2O_3$ content of the flyash is greatly reduced. The preferred cenospheres are those containing insignificant amounts of $Fe_2O_3$, are transparent and float in water. In fact, one method used to separate or concentrate these "floaters" (cenospheres) is to dump flyash into water and collect the floating particles.

Good results in accordance with the teachings of this invention are obtained in certain applications when the flyash contains up to 10 percent by volume of cenospheres. The best results are obtained when segregated samples of flyash containing up to 50 percent by volume cenospheres are employed. This, however, requires that the cenospheres be concentrated as flyash as originally collected usually contain less than 30 percent by volume of the cenospheres. In fact, the results obtained most directly relate to the percentage of cenospheres present. In most cases, the cenospheres are larger than the other particles present in flyash. In certain applications, it is preferred to employ 100 percent cenospheres, especially where clear color is important and in the preparation of the lower density foams, i.e., 1–5 pounds per cubic foot.

EXAMPLE I

Flexible polyurethane foam prepared from 3.75 parts by volume of P 502 T* and 0.25 parts by volume of P 502 C* are compared in Table I.

*Product of Stepan Chemical Company, Northfield, Illinois 60093

Table I

| Sample | Flyash (Parts by Volume) | Compressions of 1½ inch samples when stacked and subjected to identical pressure |
|---|---|---|
| A | 0 | 1½" to ¾" or 50% |
| B | 1.25 | 1½" to 1¼" or 16⅔% |

Samples A and B foamed to substantially the same volume. The flyash used in this example was derived from the Northern States Power Plant, Black Dog Plant in Burnsville, Minnesota which was burning a 73 percent "Western" and 27 percent Illinois mixture of pulverized coal at the time.

EXAMPLE II

Polyurethane foam samples were prepared from Cook No. 648 from Cooks Paint and Varnish Company in Kansas City, Missouri and 100 percent clear cenospheres produced a light color foam. The compressive strength was substantially improved without unduly affecting the foam's "recovery" as compared to a sample of the same amount of resin when foamed to the same volume. The tear strength was not adversely affected to any significant degree.

EXAMPLE III

In regard to compression strength of flexible foams, one standard way to measure this characteristic is an expression of the force required to depress the material 25 percent as compared to the force required to depress the material 65 percent. The ratio of this force is expressed as the "sag" factor in the Indentation Load Deflection Curve. Table I illustrates achievements at different levels of cenospheres in Stepan Foam 202 Samples and Stepan Foam 302 for D and E.

In addition, Sample E had a tear strength of 2.20 pounds per linear inch as compared to 1.29 percent of a comparable sample of similar compression of all urethane having a density of 9 pounds per cubic foot.

Utilizing the teachings of this invention, it is possible to obtain flexible polyurethane foams having a resin density of 3 pounds per cubic foot which have selected properties of compressibility of a foam having a resin density of 6 pounds per cubic foot without unduly reducing resiliency and elastic recovery. This is especially true in seating and floor mats, such as wrestling or exercise mats. In higher density foams, may be as high as 40 pounds per cubic foot, the teachings of this invention are still applicable, especially in uses of high impact energy absorbing applications, such as bumpers for automobiles, trains and airplanes.

Thus, although various fillers have been added to foams, especially rigid foams, such as sand, kaolinite clay, etc., they do not give the properties of a flyash containing significant amounts of cenospheres. This is especially true of flexible, elastomeric polyurethane foams. The addition of most fillers to flexible polyurethane foams produces products of lowered tear strength and interferes with the exacting requirements in the production of the foamed structure.

It should also be noted that various hollow spheres of glass, phenolic resin, Saran resin and so forth have been added to resins to produce a foam-like structure, i.e., syntactic foams.

I claim:

1. A composition of matter comprising a flexible polyurethane foam having improved compression strength produced by incorporation of cenospheres from flyash into a polyurethane foam forming composition.

2. The composition of claim 1 in which the improved polyurethane foam contains between 5 and 75 percent by volume cenospheres.

Table I

| | Samples | | | | |
|---|---|---|---|---|---|
| | A | B | C | D | E |
| Percent cenospheres by weight | 0 | 12 | 25 | 0 | 20 |
| Percent cenospheres by bulk volume | 0 | 22 | 45 | 0 | — |
| Density (pounds per cubic foot) | 2.75 | 3.05 | 3.94 | 6.0 | 6.3 |
| Compression Load Deflection (pounds per square inch) | | | | | |
| A. 25% | 0.38 | 0.41 | 0.48 | 1.4 | 1.8 |
| B. 65% | 0.75 | 0.975 | 1.80 | 3.5 | 6.4 |
| Indentation Load Deflection (pounds per 50 square inches) | | | | | |
| A. 25% | 31 | | 39 | — | — |
| B. 65% | 72 | | 159 | — | — |
| C. Sag Factor | 2.32 | | 4.08 | — | — |